United States Patent [19]

Wallis

[11] 4,312,242
[45] Jan. 26, 1982

[54] MECHANICAL VIBRATOR ASSEMBLY

[75] Inventor: William F. Wallis, Atlanta, Mich.

[73] Assignee: Besser Company, Alpena, Mich.

[21] Appl. No.: 120,638

[22] Filed: Feb. 11, 1980

[51] Int. Cl.³ .......................... B06B 1/16; B65G 27/20
[52] U.S. Cl. ........................................ 74/87; 366/128; 366/111
[58] Field of Search .............. 366/111, 112, 110, 108, 366/114, 128; 74/61, 87; 209/367

[56] References Cited

U.S. PATENT DOCUMENTS

| | | | |
|---|---|---|---|
| 2,528,620 | 11/1950 | Stroud | 74/87 |
| 2,852,946 | 9/1958 | Petrin | 74/87 |
| 2,973,606 | 3/1961 | Brandt | 366/128 |
| 3,277,731 | 10/1966 | Pinson | 74/87 |
| 3,498,601 | 3/1970 | Koval | 74/61 |
| 3,772,923 | 11/1973 | Burt | 74/61 |
| 4,262,549 | 4/1981 | Schwellenbach | 366/128 |

*Primary Examiner*—Robert W. Jenkins
*Attorney, Agent, or Firm*—Learman & McCulloch

[57] ABSTRACT

A mechanical vibrator assembly adapted to be attached to a device to be vibrated and wherein a shaft has a first weight system eccentrically fixed to the shaft, and a second axially displaced balancing weight system rotatable on the shaft. Stop surfaces limit rotation of the second weight system to approximately 180°, from a counterbalancing position substantially 180° removed from the first weight system to a shaft vibrating position just short of circumferential alignment with the first weight system. A motor drives the shaft in a direction of rotation such that a slackening of speed removes the second weight system to the 180° removed balanced position.

4 Claims, 5 Drawing Figures

MECHANICAL VIBRATOR ASSEMBLY

BACKGROUND OF THE INVENTION

The present invention relates to mechanical vibrator assemblies of the type in which a slackening or reduction in the speed of rotation of the driven shaft will cause the assembly to cease vibrating. For instance, in a concrete block manufacturing machine, the mold is vibrated after being filled with concrete to effect a densifying of the concrete material in the mold and thereafter the molded units are stripped from the mold and removed to a kiln. Conventionally, in such machinery, the vibration has been intermittent, rather than continuous, and the periods of vibration have been interrupted by periods of non-vibration to permit mold stripping and recharging of a cementitious molding material in measured amount to the mold.

I am aware that there have been proposals to utilize systems of this general type, and particularly a system which employs an eccentric shaft surrounded by a relatively rotatable counterbalancing barrel or drum to provide intermittent vibration. Generally, the system is of the type disclosed in U.S. Pat. Nos. 2,528,620; 2,673,651; 2,852,946; 3,625,974; 3,772,923; and 3,948,354.

One of the prime objects of the present invention is to provide a vibrator assembly which need utilize no eccentric shaft in its construction.

Another object of the invention is to provide an assembly of the character described which is of an extremely sensitive nature and in which, upon a slowing of the driven shaft, automatically and quickly, without utilizing return springs or the like, assumes a balanced orientation so that the vibration excitation of the body ceases.

While one use of the device has been mentioned, it is to be understood that the vibration assembly will find many uses in various machinery of the character wherein the vibration is to be automatically interrupted.

SUMMARY OF THE INVENTION

A mechanical vibratory assembly adapted to be attached to a device to be vibrated which includes a bearing supported, motor driven, non-eccentric shaft, a first weight system eccentrically rigidly mounted on the shaft, and a second weight system eccentrically mounted on the shaft axially displaced from the first weight system, there being stops limiting rotation of the second weight system on the shaft to substantially 180°, from a position substantially 180° removed radially to a position substantially in axial alignment with the first weight system. The weight systems in one position additively provide vibration, and in the other a vibrationless balance, the shaft being driven in a direction such that a slackening of speed will automatically move the second weight system to the balanced position.

Other objects and advantages of the invention will be pointed out specifically or will become apparent from the following description when it is considered in conjunction with the appended claims and the accompanying drawings, wherein:

Figure 1:
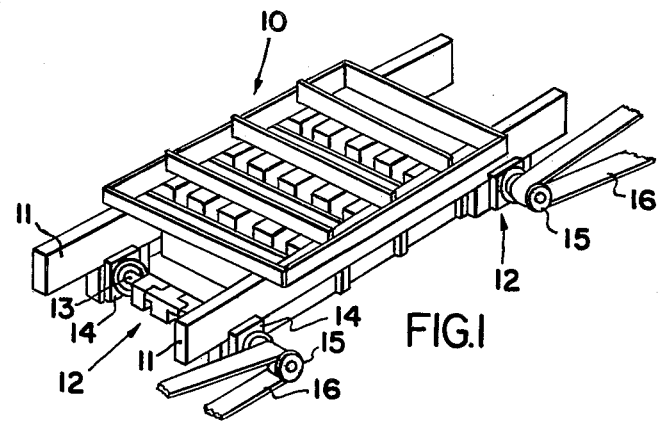
FIG. 1 is a perspective plan view, illustrating the manner in which a vibrating assembly can be used in conjunction with a concrete block mold to be vibrated.

The multi-compartmented mold box 10, shown in FIG. 1, has mold side arms 11,11, extended from each side thereof and, adjacent the outer ends of the side arms, a variable vibrator shaft assembly generally designated 12, spans the side arms 11 and is rigidly fixed thereto in a manner such that its vibration is transmitted to the side arms 11 and mold 10 in the conventional manner (see Pinson U.S. Pat. No. 3,277,731). Each assembly 12 comprises a non-eccentric shaft 13, journaled in bearings 14, provided on the side arms 11, and each shaft 13 at one end projects from one of the side arms 11 and mounts a drive sheave 15. Each sheave 15 is keyed to a shaft 13 and a belt 16, trained around each sheave 15, extends to an electric motor or other source of driving power in the usual manner. For purposes of convenience only one assembly 12 will be described inasmuch as they are identical in construction.

Figure 2:
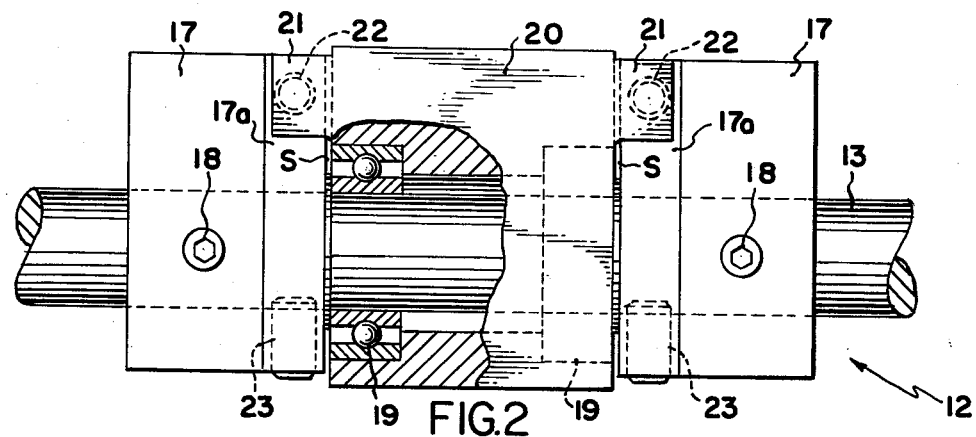
FIG. 2 is an enlarged, partly sectional, side view of the vibrating assembly in vibration producing position.

As FIG. 2 indicates, a pair of weight members 17, which broadly may be termed first weight means, or a first weight system, are fixedly secured to shaft 13, as with bolt members 18. Sandwiched between spaces S and eccentrically journaled on a pair of roller bearings 19 provided on shaft 13, is a second weight member or system 20. The weight member 20 includes a pair of axially projecting ears 21,21 adapted to engage either the inserts 22 or the inserts 23 carried by the weight member 17 in 180° cutout portions 17a to restrict movement of the weight 20 relative to weights 17 to substantially 180°. The inserts 22 and 23 are so angularly separated that the weight 20 in order to move from a position in which its ears 21 at one side 21a engage inserts 22 to a position in which its ears 21 at the opposite side 21b, engage inserts 23, travels through substantially a 180° arc. Preferably inserts 22 and 23 are nylon screw members which are threaded into openings 23 and 25, respectively, provided in the weights 17, and these inserts should project slightly from the weights 17 as indicated, for instance, at 24a and 23a in FIG. 4. With the inserts 22 projecting beyond a vertical plane through the axis of rotation, the weights 17 can never reach a position of 180° radial alignment with the ends of the pins 22 and, rather, are held about 5° removed.

THE OPERATION

Figures 4, 5:
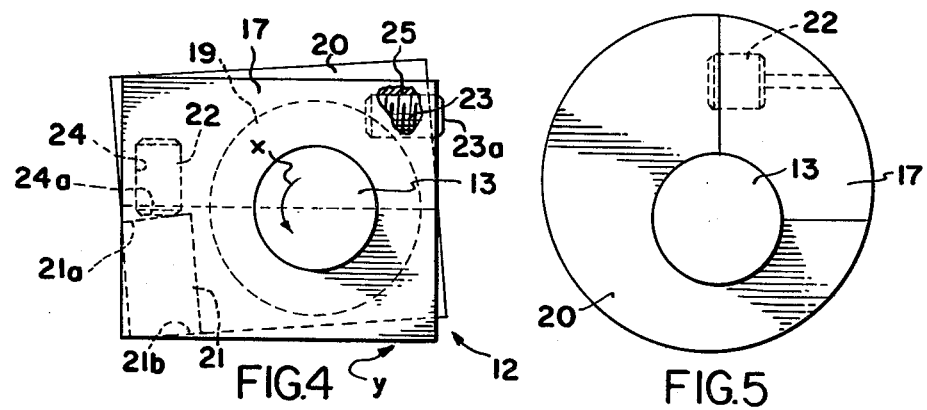
FIG. 4 is a transverse, sectional view with the weight systems shown in a vibration producing position.
FIG. 5 is a view similar to FIG. 4 illustrating a modified weight configuration which can be employed.

In FIG. 4 the pin inserts 22 on weights 17 are shown in driving relationship with the ears 21 and weight 20, with shaft 13 traveling in a counterclockwise direction x, the weight 20 also being driven in a counterclockwise direction accordingly. In the position shown, the weights 17 and 20 are both in a position of eccentricity relative to shaft 13 and the vibration resulting is transmitted to the mold 10 via bearings 14. The combined centrifugal force exerted by weights 17 is half the total centrifugal force exerted by the combined weights 17 and 20. Dynamically, assuming the natural frequency of the system is exceeded, the driving pins 22 would tend to drift away from abutting engagement with the ears 21 under constant speed conditions, if the pins 22 were not prevented by 5° from reaching a condition in which their abutment was along a truly radial plane. The structure described provides a stable thrust condition. The mold is vibrated for a sufficient length of time to properly densify the cementitious material therein and then a switch is actuated to stop the electric motor which drives belt 16.

It is not necessary that the shaft 13 be braked and stopped, however, before vibration ceases, and consequently the cycling of the concrete block producing machine can be speeded up. With the present vibrating assembly, when the counterclockwise drive of shaft 13 slackens, rotary weight 20 will have the angular momentum to continue for an instant to revolve at its former speed, with the result that it will move relatively to weights 17 in a counterclockwise arc y (FIG. 4) to a position in which its ear surfaces 21b engage the protruding ends 23a of insert pins 23 and weight 20 is displaced through approximately 180° with respect to weights 17. In this position, because of the different positions of pins 23 remote from a vertical plane z through the axis of revolution the weight 20 is exactly oppositely eccentric to the weights 17, and effectively counterbalances them, the weights 17 each being half the weight of the weight 20 and the eccentricity of weights 17 and 20 being equal.

During this interval in the cement block making method, the green blocks are stripped from the mold 10 and a new batch of cementitious material is loaded to the mold 10. When this has been accomplished, the motors driving belt 16 is once again energized and weights 17, traveling in the counterclockwise direction, catch up to the ears 21 on weight 20 so that effectively the parts are in the additively eccentric position shown in FIG. 4, and vibrate the mold with maximum vibration.

With the present assembly, the shaft 13 coasts between intervals of drive and need not be braked and then brought up to full speed from a static position. The vibrating assembly at each end of the mold is, of course, so synchronized with the other shaft assembly in an opposing mold, that simultaneous, equal rotational speed in opposite directions will produce uni-directional vibration of the rigid body during rotational acceleration and constant speed rotation of the shafts 13.

Figure 3:
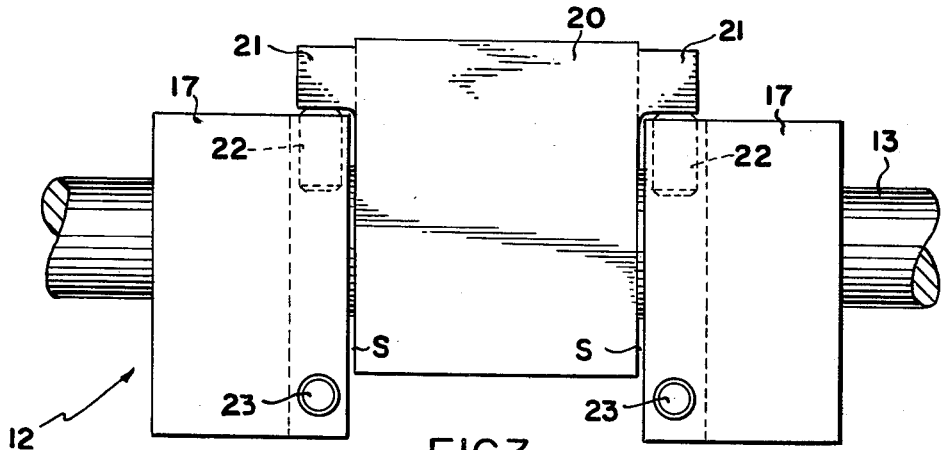
FIG. 3 is a side elevational view thereof with the parts in 180° balanced position.

While in FIGS. 2 through 4, the weights 17 and 20 are shown as rectangular in shape, it is to be understood that both the weights 17 and 20 may be circular in shape when viewed from the end, as illustrated in FIG. 5.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A mechanical vibrator assembly adapted to be attached to a device to be vibrated, comprising a bearing supported, motor driven, non-eccentric shaft bearings for the shaft; first weight means eccentrically rigidly mounted on said shaft for rotation therewith; and balancing second weight means, axially displaced from said first weight means, eccentrically mounted for rotation on said shaft; stop means on said first and second weight means limiting rotation of said second weight means on said shaft to a few degrees less than 180° from a position substantially 180° removed circumferentially from said first weight means to a shaft vibrating position just short of angular alignment with said first weight means in which the rotation of the shaft is imparted to said second weight means and the weights vibrate the shaft and bearings; the eccentricity and total weight of the second weight means relative to the eccentricity and total weight of the first weight means being so related that in the 180° removed position the first and second weight means substantially balance radially to provide a substantially vibrationless rotation of the assembly in this position; and motor means driving said shaft in a direction of rotation such that a slackening of speed of the shaft in the relative angular vibration inducing position of the first and second weight means coupled with the momentum of the second weight means will remove the second weight means angularly relative to the first weight means to the removed balanced position.

2. The improved assembly of claim 1 wherein one of said weight means comprises a pair of weights mounted axially adjacent opposite ends of the other weight means; and radially overlying stop shoulders constituting said stop means are provided on said other weight means and each of said pair of weights.

3. The improved assembly of claim 1 in which said stop shoulders on the first and second weight means are arranged to stop said first weight means about 5° short of moving into full angular alignment with said second weight means when full speed is resumed and to stop said second weight means when it moves into a 180° opposite position with respect to said first weight means.

4. The improved assembly of claim 3 wherein stop shoulders on the first weight means each comprise a wear insert stop pin which projects slightly beyond a radial plane through the axis of the weight.

* * * * *